US006530077B1

(12) United States Patent
Marsh

(10) Patent No.: US 6,530,077 B1
(45) Date of Patent: Mar. 4, 2003

(54) DEVICE AND METHOD FOR RELEASING AN IN-MEMORY EXECUTABLE IMAGE FROM ITS DEPENDENCE ON A BACKING STORE

(75) Inventor: Russell J. Marsh, Lindon, UT (US)

(73) Assignee: PowerQuest Corporation, Orem, UT (US)

(*) Notice: Subject to any disclaimer, the term of this patent is extended or adjusted under 35 U.S.C. 154(b) by 0 days.

(21) Appl. No.: 09/396,593

(22) Filed: Sep. 15, 1999

(51) Int. Cl.[7] .......................... G06F 9/44; G06F 12/00
(52) U.S. Cl. ................... 717/131; 717/120; 711/147
(58) Field of Search .................. 717/131, 120–121, 717/127, 151; 711/100, 147, 152–153, 200; 712/216, 248

(56) References Cited

U.S. PATENT DOCUMENTS

| 4,422,144 | A | * | 12/1983 | Johnson et al. ............. 712/248 |
| 5,398,321 | A | * | 3/1995 | Jeremiah ..................... 712/216 |
| 5,634,058 | A | * | 5/1997 | Allen et al. .................. 717/163 |
| 5,675,769 | A | | 10/1997 | Ruff et al. ............. 395/497.04 |
| 5,706,472 | A | | 1/1998 | Ruff et al. ............. 395/497.04 |
| 5,813,042 | A | * | 9/1998 | Campbell et al. ........... 711/159 |
| 5,878,263 | A | * | 3/1999 | Fortin et al. ................ 717/162 |
| 5,930,831 | A | | 7/1999 | Marsh et al. ................ 711/173 |
| 6,006,033 | A | * | 12/1999 | Heisch ........................ 717/158 |
| 6,085,296 | A | * | 7/2000 | Karkhanis et al. .......... 711/147 |
| 6,108,759 | A | * | 8/2000 | Orcutt et al. ................ 711/173 |
| 6,330,653 | B1 | * | 12/2001 | Murray et al. .............. 711/173 |

OTHER PUBLICATIONS

Inagaki et al. Supporting Software Distributed Shared Memory with an Optimizing Compiler. IEEE. 1998. pp. 225–235.*

Karlsson et al. Producer–Push—Protocol Enhancement to Page–based Software Distributed Shared Memory Systems. IEEE. 1999. pp. 291–300.*
Ueng et al. Proteus: A Runtime Reconfigurable Distributed Shared Memory System. IEEE. 1999. pp. 347–348.*
Oskin et al. Active OS: Virtualizing Intelligent Memory. IEEE. 1999. pp. 202–208.*
Hosking et al. Protection Traps and Alternative For Memory Management of an Object–oriented Language. ACM. 1993. pp. 106–119.*
Fleisch et al. Mirage: A Coherent Distributed Shared Memory Design. ACM. 1989. pp. 211–223.*
Matt Pietrek, "Peering Inside the PE: A Tour of the Win32 Portable Executable File Format", Mar. 1994.

* cited by examiner

Primary Examiner—Gregory Morse
Assistant Examiner—Wei Zhen
(74) Attorney, Agent, or Firm—Computer Law ++

(57) ABSTRACT

A Windows NT partitioning program partitions a storage device in Windows NT boot mode (i.e., after the Windows NT kernel loads device drivers and before the Session Manager loads the Windows NT user interface). In this mode, the partitioning program is capable of corrupting its own backing store—a Windows NT executable file stored on the storage device—through the partitioning process. Such corruption would generally lead to execution errors in the partitioning program when code or data from the corrupted executable file is paged into the program's in-memory executable image. To avoid such errors, the working set allocated to the executable image is expanded to accommodate all the pageable Windows NT program sections in the executable file. Each pageable program section is then locked into the executable image. As a result, the entire partitioning program is resident in the executable image, so no paging is necessary from the corrupted executable file into the executable image, and any possible execution errors resulting from the corruption of the executable file are avoided.

33 Claims, 4 Drawing Sheets

DEVICE AND METHOD FOR RELEASING AN IN-MEMORY EXECUTABLE IMAGE FROM ITS DEPENDENCE ON A BACKING STORE

TECHNICAL FIELD OF THE INVENTION

This invention relates in general to computer software and, more specifically, to devices and methods for releasing an in-memory executable image (e.g., an executing partitioning program) from its dependence on a backing store (e.g., an executable file stored on a hard disk being partitioned by the partitioning program).

BACKGROUND OF THE INVENTION

"Partitioning" refers to a process by which a computer storage device, such as a hard disk, is divided into multiple logical devices. For example, a computer user wishing to run both the Windows NT® and Linux® operating systems from a single hard disk might partition the disk into two logical devices—one for running Windows NT®, and the other for running Linux®.

The assignee of this invention, PowerQuest Corporation, has developed partitioning software (referred to as "PartitionMagic®") to assist computer users in the partitioning process described above. Various implementations of this software are described in detail in U.S. Pat. Nos. 5,675,769 and 5,706,472 to Ruff et al., and U.S. Pat. No. 5,930,831 to Marsh et al.

When running as a Win32 program (i.e., a 32-bit Windows® program) under the Windows NT® operating system, PartitionMagic® can only operate on partitions that have no open files. Since the Windows NT® operating system always has at least some open files running from its own partition, PartitionMagic® cannot operate on the Windows NT® partition when it runs as a Win32 program.

Accordingly, PartitionMagic® has been designed to also run in the Windows NT® boot mode, where it can operate on all partitions, including the Windows NT® partition. In this mode, the Windows NT® kernel loads first. The kernel then loads any device drivers. A portion of the kernel referred to as the "Session Manager" then executes any programs that require hard disk access before the Windows® user interface is loaded. In addition to PartitionMagic®, such programs include 'autochk.exe' (a utility for checking the condition of the hard disk) and 'autoconv.exe' (a utility for performing file system conversions), both from Microsoft® Corporation, and 'autofat.exe' and 'autontfs.exe' (utilities for file defragmentation), both from Executive Software, Inc. Once these programs have executed, the Session Manager generally loads the Windows® user interface to initiate the Windows NT® Win32 mode, although PartitionMagic® reboots instead.

As shown in FIG. 1, a program, such as PartitionMagic®, running in Windows NT® boot mode generally includes an in-memory executable image 10 stored in computer memory 12, and an executable file 14 (referred to as a "backing store") stored on a hard disk 16. The in-memory executable image 10 is allocated a range of the memory 12—referred to as its "working set" —that is something less than is required to load the entire program into the memory 12 from the executable file 14. In order to run the entire program, the Windows NT® kernel pages (i.e., swaps) portions of the executable file 14 (e.g., a portion 20) into the in-memory executable image 10 on demand, and in the process overwrites portions of the executable image 10 (e.g., a portion 18) that aren't immediately needed.

This can be problematic during the partitioning process, because PartitionMagic® may corrupt the executable file 14 by copying the file 14 to a new location on the hard disk 16 and then overwriting the original location of the file 14 with other data. As a result, when the Windows NT® kernel attempts to page code from the original location of the executable file 14 into the executable image 10, it is actually paging in foreign data that is not from the executable file 14. This inevitably leads to execution errors in PartitionMagic® when an attempt is made to execute the foreign data paged into the executable image 14.

Thus, there is a need in the art for a device and method that release an in-memory executable image from its dependence on a backing store, thereby avoiding the possibility of paging foreign data into the executable image.

SUMMARY OF THE INVENTION

In one embodiment of this invention, one or more pageable program sections contained in a Windows NT executable file are executed (i.e., run) by first booting into Windows NT boot mode. Then, while in Windows NT boot mode, an in-memory executable image is generated from the executable file, a working set of the executable image is adjusted so the image can accommodate all the pageable program sections of the executable file, all the pageable program sections are locked into the executable image, and the image is executed. This effectively releases the executable image from its dependence on the executable file as its backing store.

The working set of the executable image can be adjusted by, for example, calling a working set Windows NT Application Programming Interface (API) with the necessary working set parameters. Also, the pageable program sections can be locked into the executable image by, for example, passing a base address and a section size for each of the sections to a locking Windows NT API. The base address and section size for each section can be obtained, for example, from fields in a section header associated with each section and contained in the executable file.

In another embodiment of this invention, an in-memory executable image is released from its dependence on a Windows NT executable file containing one or more pageable program sections as its backing store. Specifically, while in Windows NT boot mode, a working set of the in-memory executable image is adjusted so the image can accommodate all the pageable program sections of the Windows NT executable file, and all the pageable program sections are then locked into the in-memory executable image.

In yet another embodiment of this invention, one or more pageable computer program portions contained in an executable file, and capable of corrupting the file upon execution, are executed by generating an in-memory executable image from the file. Enough memory is allocated to the executable image for the image to accommodate all the pageable computer program portions of the executable file. All the pageable computer program portions are then locked into the executable image, and the image is executed, thereby corrupting the executable file. The executable image continues to execute after corrupting the executable file by not paging program portions into the image from the corrupted file.

In still another embodiment of this invention, a storage medium in a computer system is partitioned by providing an executable file (e.g., a Windows NT executable file) on the storage medium containing one or more pageable computer program portions that partition the storage medium. An in-memory executable image is generated from the executable file, and enough memory in the computer system is allocated to the executable image for the image to accommodate all the pageable computer program portions of the executable file. All the pageable computer program portions are locked into the executable image, and the image is executed without paging program portions into the image from the executable file, thereby partitioning the storage medium.

In a further embodiment of this invention, a storage medium in a computer system is partitioned by providing a Windows NT executable file on the storage medium. The file contains pageable computer program sections (e.g., '.text' and 'data' sections) that partition the storage medium, and one or more section headers corresponding to the pageable computer program sections, each of which includes a base address and a section size for its corresponding pageable computer program section. The computer system is booted into Windows NT boot mode and, while in Windows NT boot mode, an in-memory executable image is generated from the executable file. A working set Windows NT Application Programming Interface (API) is then called to adjust a working set of the executable image so the image can accommodate all the pageable computer program sections of the executable file. Next, the base address and section size for each pageable computer program section is retrieved from its corresponding section header, and the base address and section size for each section is passed to a locking Windows NT API to lock the section into the executable image. Finally, the executable image is executed without paging program sections into the image from the executable file, thereby partitioning the storage medium.

In a still further embodiment of this invention, a computer program is executed in a computer system by first providing a storage medium in the computer system. The storage medium may comprise, for example, a hard drive, a storage area network, or a storage array. The storage medium has at least one partition thereon generated by providing an executable file on the storage medium containing one or more pageable computer program portions that partition the storage medium, generating an in-memory executable image from the executable file, allocating enough memory in the computer system to the executable image for the image to accommodate all the pageable computer program portions of the executable file, locking all the pageable computer program portions into the executable image, and executing the executable image without paging program portions into the image from the executable file, thereby generating the at least one partition thereon. The computer program is then provided in the partition on the storage medium, and the program is executed from the partition.

In an additional embodiment of this invention, an apparatus for releasing an in-memory executable image from its dependence on a Windows NT executable file containing one or more pageable program sections as its backing store includes a device that adjusts a working set of the in-memory executable image in Windows NT boot mode so the image can accommodate all the pageable program sections of the Windows NT executable file, and a device that locks all the pageable program sections into the in-memory executable image in Windows NT boot mode.

In a still additional embodiment of this invention, an apparatus for executing one or more pageable computer program portions contained in an executable file, and capable of corrupting the executable file upon execution, includes a device that generates an in-memory executable image from the executable file. An allocating device allocates enough memory to the executable image for the image to accommodate all the pageable computer program portions of the executable file, and a locking device locks all the pageable computer program portions into the executable image. Also, an executing device executes the executable image, thereby corrupting the executable file, and then continues to execute the executable image after corrupting the executable file by executing the image without paging program portions into the image from the corrupted executable file.

In yet another additional embodiment of this invention, an electronic system, such as a computer system, incorporates the apparatus described immediately above.

In still another additional embodiment of this invention, a computer-readable medium (e.g., a computer-readable storage medium such as a hard drive, or a signal carrier such as a carrier wave) has one or more computer program portions embodied therein that release an in-memory executable image from its dependence on a Windows NT executable file containing one or more pageable program sections as its backing store. The computer program portions include a computer program portion that adjusts a working set of the in-memory executable image in Windows NT boot mode so the image can accommodate all the pageable program sections of the Windows NT executable file, and a computer program portion that locks all the pageable program sections into the in-memory executable image in Windows NT boot mode.

In another further embodiment of this invention, a computer-readable medium has one or more computer program portions embodied therein for executing a computer program contained in an executable file and capable of corrupting the executable file upon execution. The computer program portions include a computer program portion that generates an in-memory executable image from the executable file, a computer program portion that allocates enough memory to the executable image for the image to accommodate all pageable portions of the computer program, a computer program portion that locks all the pageable portions of the computer program into the executable image, a computer program portion that executes the executable image, thereby corrupting the executable file, and a computer program portion that continues to execute the executable image after corrupting the executable file by executing the image without paging program portions into the image from the corrupted executable file.

In yet another further embodiment of this invention, a functionality-realizing medium (e.g., a computer-readable medium) having functional data (e.g., computer program portions) embodied therein includes a computer program portion that generates an in-memory executable image from an executable file containing a computer program capable of corrupting the executable file upon execution, a computer program portion that allocates enough memory to the executable image for the image to accommodate all pageable portions of the computer program, a computer program portion that locks all the pageable portions of the computer program into the executable image, a computer program portion that executes the executable image, thereby corrupting the executable file, and a computer program portion that continues to execute the executable image after corrupting the executable file by executing the image without paging program portions into the image from the corrupted executable file.

DETAILED DESCRIPTION OF THE ILLUSTRATED EMBODIMENTS

Figure 1:
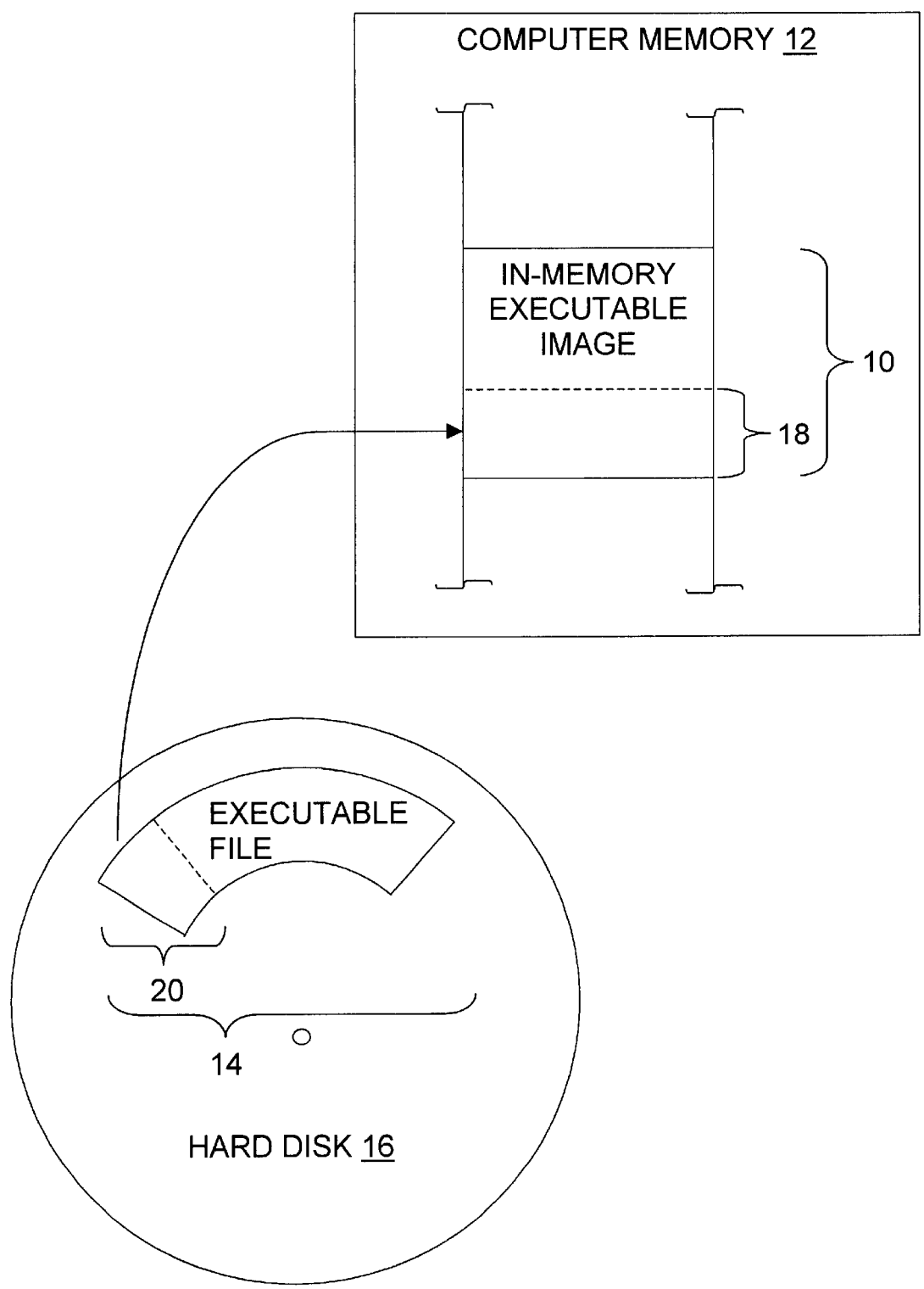
FIG. 1 is a diagram illustrating the conventional relationship between an in-memory executable image and its associated executable file in the Windows NT® environment.
Figure 2:
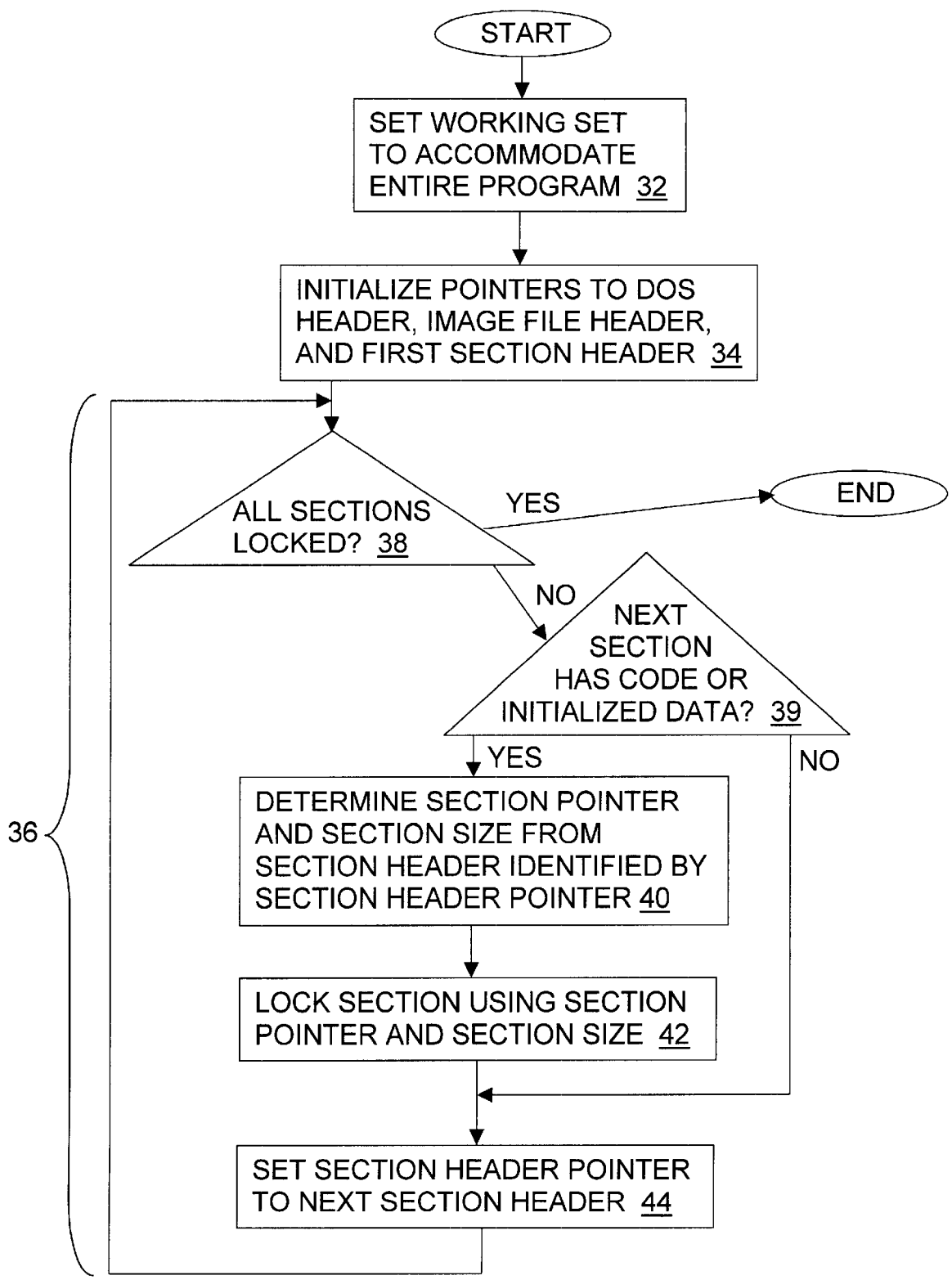
FIG. 2 is a flow diagram illustrating a method for releasing an executable image from its dependence on a backing store in accordance with this invention.
Figure 3:
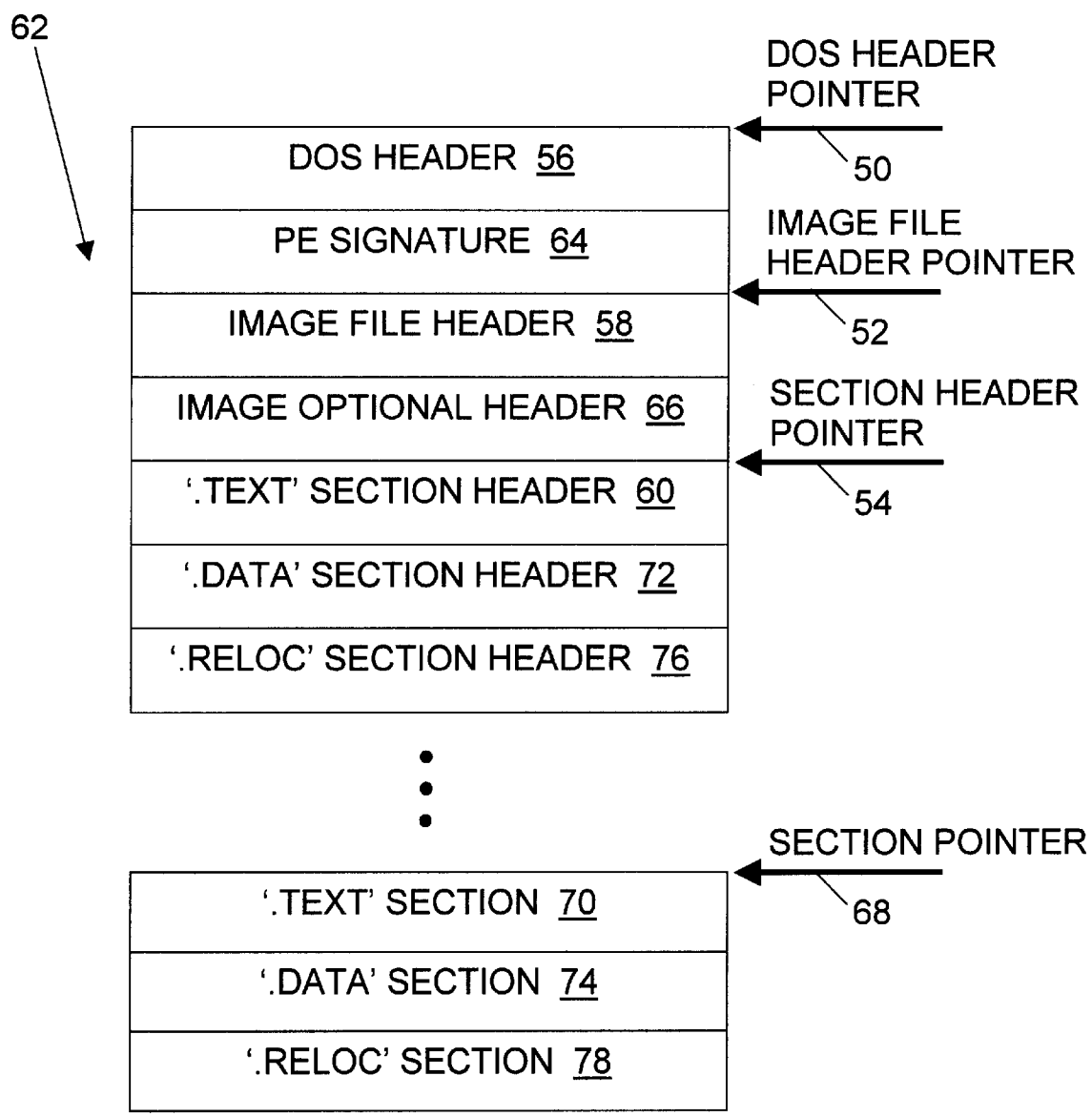
FIG. 3 is a diagram illustrating portions of a computer program indexed by pointers in accordance with the method of FIG. 2.

As shown in FIGS. 2 and 3, a method 30 for releasing an in-memory executable image associated with a computer program 62 from its dependence on a backing store (e.g., an executable file) includes the initial step 32 of setting the working set for the program 62 so the executable image can accommodate the program 62 without needing to page in code or data from the backing store.

It will be understood by those having skill in the technical field of this invention that the invention is applicable to a wide variety of computer programs including, for example, partitioning programs (e.g., PartitionMagic®). It will also be understood that the term "backing store" refers, in general, to a stored computer file (e.g., an executable file) that acts as the source for code or data paged into an in-memory executable image for execution. It will further be understood that while this invention will be described in connection with embodiments that operate in cooperation with the Windows NT® operating system, the invention is applicable to any operating system environment in which an executable image needs to be released from its dependence on a backing store.

The working set may be set in the step 32 by calling an Application Programming Interface (API) associated with the Windows NT® operating system with new working set parameters. Example pseudo-code for performing the step 32 is as follows:

```
{
    Minimum Working Set Size = 4,000,000;
    Maximum Working Set Size = 5,000,000;
    call Working Set API with Minimum and Maximum Working
    Set Sizes;
}
```

The Windows NT® operating system responds to the call to the Working Set API by allotting the requested working set to the program 62.

Of course, it will be understood that the actual working set parameters are determined by the amount of memory needed to accommodate the program 62 in the in-memory executable image, and may differ from the 4,000,000 minimum and 5,000,000 maximum shown here. Also, it will be understood that the Working Set API will differ from operating system to operating system, and that those having skill in the technical field of this invention will have readily available or ascertainable knowledge of the Working Set API.

The method 30 includes a further step 34 in which respective pointers 50, 52, and 54 to a DOS header 56, an image file header 58, and a '.text' section header 60 of the program 62 are initialized. It will be understood by those having skill in the technical field of this invention that the program 62 is shown in FIG. 3 in the well-known Portable Executable (PE) File Format used for executables in the Windows NT® operating system. Example pseudo-code for performing the step 34 is as follows:

```
{
    DOS header pointer = Base Address pointer;
    Image File header pointer = Base Address pointer +
    DOS header pointer->e_lfanew + SIZE OF PE SIGNATURE;
    Section header pointer = Image File header pointer +
    SIZE OF IMAGE FILE HEADER + SIZE OF IMAGE OPTIONAL
    HEADER;
}
``` where the "Base Address pointer" is a pointer to the base address of the program 62 supplied by the Windows NT® kernel, "e_fanew" is an offset field stored in the DOS header 56 that identifies the relative location of a PE signature 64 in the program 62, "SIZE OF PE SIGNATURE" is a value (usually four bytes) representing the size of the PE signature 64, "SIZE OF IMAGE FILE HEADER" is a value representing the size of the Image file header 58, and "SIZE OF IMAGE OPTIONAL HEADER" is a value representing the size of an Image Optional header 66 in the program 62.

Once the pointers 50, 52, and 54 are initialized, the method 30 moves on to a section locking loop 36. Initially, since no sections have been locked, a decisional step 38 passes control to another decisional step 39, where it is determined whether the next section contains code or initialized data. If it does, control is passed to a step 40 in which a section pointer 68 and the size of a '.text' section 70 are determined from the '.text' section header 60. A step 42 then locks the '.text' section 70 into memory by passing the section pointer 68 and the size of the '.text' section 70 to a locking API associated with the Windows NT® operating system. It will be understood that the locking API will differ from operating system to operating system, and that those having skill in the technical field of this invention will have readily available or ascertainable knowledge of the locking API.

With the '.text' section 70 locked into memory, the section header pointer 54 is moved in a step 44 so it points at the next section header—a '.data' section header 72.

The method 30 then continues through the locking loop 36 in the same manner as described above, moving the section pointer 68 so it points at a '.data' section 74, locking the '.data' section 74 into memory by passing the section pointer 68 and the size of the '.data' section 74 to the locking API, and moving the section header pointer 54 to point at a '.reloc' section header 76. Because a '.reloc' section 78 is not pageable (i.e., does not contain code or data that might be paged in during execution of the program 62), the decisional step 39 passes control to the step 44, and the decisional step 38 then ends the loop 36.

Example pseudo-code for the locking loop 36 is as follows:

```
{
    for (Section = 0; Section < Image File header pointer->
    NumberofSections; Section++);
    {
        section pointer = Base Address pointer +
        Section header pointer->Virtual Address;
        section size = Section header pointer->Misc. VirtualSize;
        pass section pointer and section size to locking API;
        new Section header pointer = old Section header pointer +
```

```
        SIZE OF SECTION HEADER;
    }
}
``` where "Section" is a counter for the locking loop 36, "NumberofSections" is a field stored in the Image File header 58 that identifies the number of sections in the program 62, "Virtual Address" is a field stored in the section headers 60, 72, and 76 that identifies the relative address of the respective sections 70, 74, and 78, "Misc. Virtual Size" is a field stored in the section headers 60, 72, and 76 that identifies the size of the respective sections 70, 74, and 78, and "SIZE OF SECTION HEADER" is a value representing the size of the section headers 60, 72, and 76.

It will be understood that although this invention is being described with respect to an embodiment including only '.text', '.data', and '.reloc' sections, the invention is not limited to such an embodiment. In fact, the invention is equally applicable to programs that contain a wide variety of other sections including, for example, '.edata' and '.idata' sections. It will also be understood that the invention is applicable to other operating systems having an executable format that does not include PE style sections but does include code and initialized data.

Figure 4:
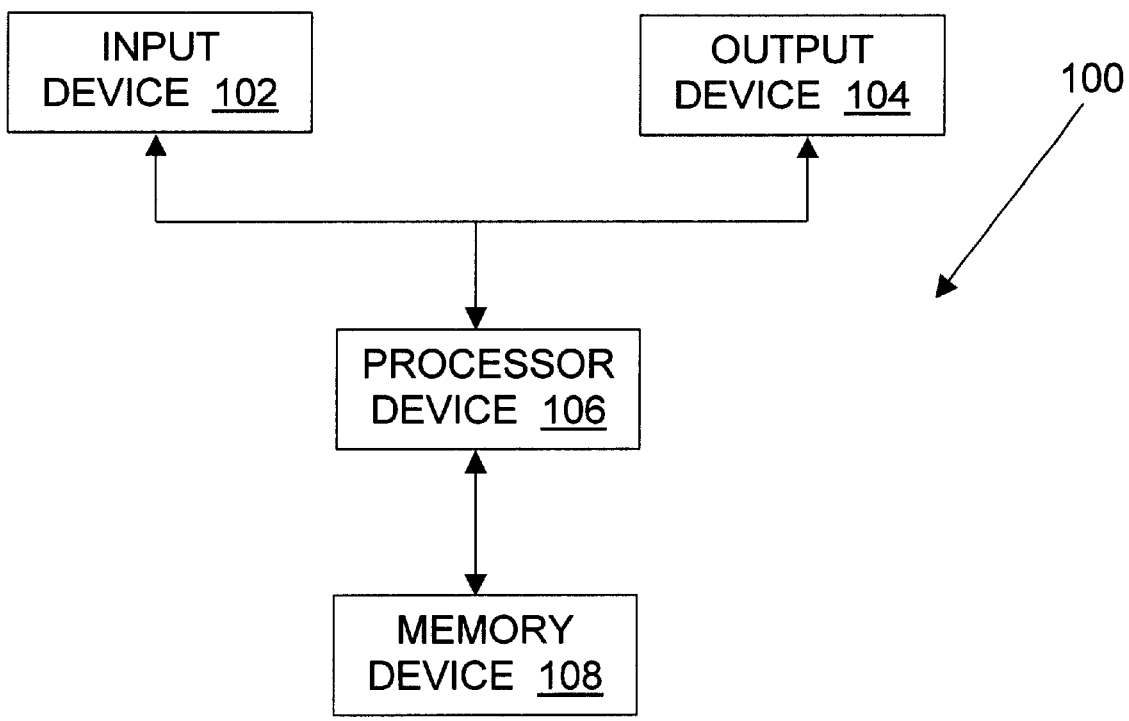
FIG. 4 is a block diagram illustrating an electronic system executing the method of FIG. 2.

As shown in FIG. 4, an electronic system 100 upon which the program 62 of FIG. 3 executes includes an input device 102, an output device 104, a processor device 106, and a memory device 108. The electronic system 100 may be, for example, a PC-compatible computer system running the Windows NT® operating system.

It will be understood by those having skill in the technical field of this invention that the term "computer-readable medium" as used in the appended claims refers to any medium by which the functionality of a computer code portion may be realized. Such a medium may include, for example, a computer-readable storage medium such as a floppy disk, CD-ROM, DVD-ROM, Jaz® or Zip® disk, hard drive, storage area network, storage array (e.g., a RAID device), or memory device (e.g., a DRAM, SRAM, ROM, or flash EEPROM). A computer-readable medium may also include, for example, a signal carrier, such as a conductor, a carrier wave, or an electromagnetic emission (e.g., a light emission).

Also, it will be understood that the term "computer program portion" as used in the appended claims refers to any functional descriptive material, such as code or data, for use in a computing device. Such material may include, for example, computer code capable of execution, either directly or indirectly, on a computing device. Computer code capable of indirect execution may include, for example, code requiring decryption, decompression, or run-time compilation immediately prior to execution. It will also be understood that the term "computer program portion" as used in the appended claims is not restricted to any particular source code language (e.g., Java® or C/C$^{+-}$) or language type (e.g., sequential or object-oriented), and that different computer program portions described as having different functions may share some code or data in common with one another.

Although this invention has been described with reference to particular embodiments, the invention is not limited to these described embodiments. For example, while the invention has been described with respect to a method having a series of sequential steps, the invention is not limited to the described sequence of steps, but rather includes within its scope any operable sequence of the described steps. Thus, the invention is limited only by the appended claims, which include within their scope all equivalent devices and methods that operate according to the principles of the invention as described.

What is claimed is:

1. A method for executing one or more pageable program sections contained in a Windows NT executable file, the method comprising:

booting into Windows NT boot mode; and
   while in Windows NT boot mode,
   generating an in-memory executable image from the executable file;
   adjusting a working set of the executable image so the image can accommodate all the pageable program sections of the executable file;
   locking all the pageable program sections into the executable image, and
   executing the executable image.

2. The method of claim 1, wherein the act of adjusting the working set of the executable image comprises calling a working set Windows NT Application Programming Interface (API) with working set parameters sufficient to accommodate all the pageable program sections of the executable file.

3. The method of claim 1, wherein the act of adjusting the working set of the executable image comprises increasing the working set of the executable image.

4. The method of claim 1, wherein the Windows NT executable file also contains section headers corresponding to the pageable program sections, wherein the act of locking all the pageable program sections into the executable image comprises, for each pageable program section:

retrieving a base address and a section size for the section from its corresponding section header; and
   passing the base address and section size for the section to a locking Windows NT Application Programming Interface (API) to lock the section into the executable image.

5. A method for releasing an in-memory executable image from its dependence on a Windows NT executable file containing one or more pageable program sections as its backing store, the method comprising:

in Windows NT boot mode,
   adjusting a working set of the in-memory executable image so the image can accommodate all the pageable program sections of the Windows NT executable file; and
   locking all the pageable program sections into the in-memory executable image.

6. In a computer system having a memory, a method for executing one or more pageable computer program portions contained in an executable file, the pageable computer program portions being capable of corrupting the executable file upon execution, the method comprising:

generating an in-memory executable image from the executable file;
   allocating enough of the memory to the executable image for the image to accommodate all the pageable computer program portions of the executable file;
   locking all the pageable computer program portions into the executable image;
   executing the executable image, thereby corrupting the executable file; and
   continuing to execute the executable image after corrupting the executable file by executing the image without paging computer program portions into the image from the corrupted executable file.

7. The method of claim 6, wherein the act of allocating enough of the memory to the executable image comprises adjusting a working set of the executable image so the image can accommodate all the pageable computer program portions of the executable file.

8. The method of claim 6, wherein the executable file is stored on a storage medium of the computer system, wherein the act of executing the executable image includes partitioning the storage medium, thereby overwriting an original location of the executable file on the storage medium, wherein the act of continuing to execute the executable image includes continuing to partition the storage medium after overwriting the original location of the executable file by executing the image without paging computer program portions into the image from the original location of the executable file.

9. In a computer system having a memory and a storage medium, a method for partitioning the storage medium, the method comprising:
 providing an executable file on the storage medium containing one or more pageable computer program portions for partitioning the storage medium;
 generating an in-memory executable image from the executable file;
 allocating enough of the memory to the executable image for the image to accommodate all the pageable computer program portions of the executable file;
 locking all the pageable computer program portions into the executable image; and
 executing the executable image without paging computer program portions into the image from the executable file, thereby partitioning the storage medium.

10. The method of claim 9, wherein the act of providing the executable file on the storage medium comprises providing a Windows NT executable file on the storage medium containing one or more pageable Windows NT computer program sections for partitioning the storage medium.

11. In a computer system having a storage medium, a method for partitioning the storage medium, the method comprising:
 providing a Windows NT executable file on the storage medium containing one or more pageable computer program sections for partitioning the storage medium and one or more section headers corresponding to the pageable computer program sections, each section header including a base address and a section size for its corresponding pageable computer program section;
 booting the computer system into Windows NT boot mode; and
 while in Windows NT boot mode,
  generating an in-memory executable image from the executable file;
  calling a working set Windows NT Application Programming Interface (API) to adjust a working set of the executable image so the image can accommodate all the pageable computer program sections of the executable file;
  for each pageable computer program section in the executable file,
   retrieving the base address and section size for the section from its corresponding section header; and
   passing the base address and section size for the section to a locking Windows NT API to lock the section into the executable image; and
  executing the executable image without paging computer program sections into the image from the executable file, thereby partitioning the storage medium.

12. The method of claim 11, wherein the act of providing a Windows NT executable file on the storage medium containing one or more pageable computer program sections comprises providing a Windows NT executable file on the storage medium containing a '.text' computer program section and a '.data' computer program section.

13. The method of claim 11, wherein the act of retrieving the base address and section size for each section from its corresponding section header includes generating a pointer to each section header.

14. A method of executing a computer program in a computer system having a memory, the method comprising:
 providing a storage medium in the computer system having at least one partition thereon generated by:
  providing an executable file on the storage medium containing one or more pageable computer program portions for partitioning the storage medium;
  generating an in-memory executable image from the executable file;
  allocating enough of the memory to the executable image for the image to accommodate all the pageable computer program portions of the executable file;
  locking all the pageable computer program portions into the executable image; and
  executing the executable image without paging computer program portions into the image from the executable file, thereby generating the at least one partition thereon;
 providing the computer program in the at least one partition on the storage medium; and
 executing the computer program from the at least one partition on the storage medium.

15. The method of claim 14, wherein the act of providing a storage medium comprises providing a storage medium selected from a group comprising a hard drive, a storage area network, and a storage array.

16. The method of claim 14, wherein the act of providing the computer program in the at least one partition on the storage medium comprises providing Windows NT in the at least one partition on the storage medium, wherein the act of executing the computer program from the at least one partition on the storage medium comprises executing Windows NT from the at least one partition.

17. An apparatus for releasing an in-memory executable image from its dependence on a Windows NT executable file containing one or more pageable program sections as its backing store, the apparatus comprising:
 a device for adjusting a working set of the in-memory executable image in Windows NT boot mode so the image can accommodate all the pageable program sections of the Windows NT executable file; and
 a device for locking all the pageable program sections into the in-memory executable image in Windows NT boot mode.

18. The apparatus of claim 17, wherein the adjusting device comprises one or more computer program portions for calling a working set Windows NT Application Programming Interface (API), wherein the locking device comprises one or more computer program portions for calling a locking Windows NT API.

19. The apparatus of claim 18, wherein the working set and locking computer program portions comprise respective working set and locking Windows NT computer program sections.

20. In a computer system having a memory, an apparatus for executing one or more pageable computer program portions contained in an executable file, the pageable computer program portions being capable of corrupting the executable file upon execution, the apparatus comprising:

- a device for generating an in-memory executable image from the executable file;
- a device for allocating enough of the memory to the executable image for the image to accommodate all the pageable computer program portions of the executable file;
- a device for locking all the pageable computer program portions into the executable image;
- a device for executing the executable image, thereby corrupting the executable file; and
- a device for continuing to execute the executable image after corrupting the executable file by executing the image without paging computer program portions into the image from the corrupted executable file.

21. The apparatus of claim 20, wherein the pageable computer program portions comprise a partitioning program.

22. The apparatus of claim 20, wherein the generating, allocating, locking, executing, and continuing-to-execute devices together comprise one or more Windows NT computer program sections.

23. An electronic system comprising an input device, an output device, a memory device, and a processor device coupled to the input, output, and memory devices, at least one of the input, output, memory, and processor devices including an apparatus for executing one or more pageable computer program portions contained in an executable file, the pageable computer program portions being capable of corrupting the executable file upon execution, the apparatus comprising:

- a device for generating an in-memory executable image from the executable file;
- a device for allocating enough memory in the memory device to the executable image for the image to accommodate all the pageable computer program portions of the executable file;
- a device for locking all the pageable computer program portions into the executable image;
- a device for executing the executable image, thereby corrupting the executable file; and
- a device for continuing to execute the executable image after corrupting the executable file by executing the image without paging computer program portions into the image from the corrupted executable file.

24. The electronic system of claim 23, wherein the electronic system comprises a computer system.

25. A computer-readable medium having one or more computer program portions embodied therein for releasing an in-memory executable image from its dependence on a Windows NT executable file containing one or more pageable program sections as its backing store, the computer program portions comprising:

- a computer program portion for adjusting a working set of the in-memory executable image in Windows NT boot mode so the image can accommodate all the pageable program sections of the Windows NT executable file; and
- a computer code portion for locking all the pageable program sections into the in-memory executable image in Windows NT boot mode.

26. The computer-readable medium of claim 25, wherein the computer-readable medium comprises a computer-readable storage medium selected from a group comprising a floppy disk, a CD-ROM, a DVD-ROM, a Jaz disk, a Zip disk, a hard drive, a storage area network, and a storage array.

27. The computer-readable medium of claim 25, wherein the computer-readable medium comprises a signal carrier selected from a group comprising a carrier wave, a conductor, and an electromagnetic emission.

28. The computer-readable medium of claim 25, wherein the computer program portion for adjusting a working set of the in-memory executable image in Windows NT boot mode comprises a computer program portion for adjusting a working set of the in-memory executable image after Windows NT loads any device drivers and before the Windows NT Session Manager loads a Windows NT user interface.

29. The computer-readable medium of claim 25, wherein the computer-readable medium having one or more computer program portions embodied therein comprises a computer-readable storage medium having one or more computer program portions stored thereon.

30. The computer-readable medium of claim 25, wherein the computer-readable medium having one or more computer program portions embodied therein comprises a signal carrier having one or more computer program portions propagating thereon.

31. A computer-readable medium having one or more computer program portions embodied therein for executing a computer program contained in an executable file, the computer program being capable of corrupting the executable file upon execution, the computer program portions comprising:

- a computer program portion for generating an in-memory executable image from the executable file;
- a computer program portion for allocating enough memory to the executable image for the image to accommodate all active portions of the computer program;
- a computer program portion for locking all the active portions of the computer program into the executable image;
- a computer program portion for executing the executable image, thereby corrupting the executable file; and
- a computer program portion for continuing to execute the executable image after corrupting the executable file by executing the image without paging computer program portions into the image from the corrupted executable file.

32. A functionality-realizing medium having functional data embodied therein comprising:

- a computer program portion for generating an in-memory executable image from an executable file containing a computer program capable of corrupting the executable file upon execution;
- a computer program portion for allocating enough memory to the executable image for the image to accommodate all active portions of the computer program;
- a computer program portion for locking all the active portions of the computer program into the executable image;
- a computer program portion for executing the executable image, thereby corrupting the executable file; and
- a computer program portion for continuing to execute the executable image after corrupting the executable file by executing the image without paging computer program portions into the image from the corrupted executable file.

33. The functionality-realizing medium of claim 32, wherein the functionality-realizing medium having functional data embodied therein comprises a computer-readable medium having one or more computer program portions embodied therein.

* * * * *